(12) United States Patent
Koyama (10) Patent No.: US 7,331,640 B2
(45) Date of Patent: Feb. 19, 2008

(54) VEHICULAR BRAKE CONTROL APPARATUS AND CONTROL METHOD THEREFOR

(75) Inventor: Tooru Koyama, Nagano (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 21 days.

(21) Appl. No.: 11/276,897

(22) Filed: Mar. 17, 2006

(65) Prior Publication Data

US 2006/0220450 A1 Oct. 5, 2006

(30) Foreign Application Priority Data

Mar. 17, 2005 (JP) ............................. 2005-076971
Mar. 14, 2006 (JP) ............................. 2006-068857

(51) Int. Cl.
*B60T 13/00* (2006.01)

(52) U.S. Cl. ..................................................... 303/9.64
(58) Field of Classification Search .................... 303/2, 303/9.61, 9.62, 9.64, 9.71
See application file for complete search history.

(56) References Cited

U.S. PATENT DOCUMENTS 5,249,848 A * 10/1993 Matsuto et al. ............. 303/163
5,273,346 A * 12/1993 Tsuchida et al. ............... 303/2
6,273,523 B1 8/2001 Wakabayashi et al.
6,409,285 B1 6/2002 Wakabayashi et al.
2003/0015916 A1* 1/2003 Sakamoto .................... 303/137

FOREIGN PATENT DOCUMENTS

| DE | 199 39 826 A1 | 3/2001 |
| EP | 1 277 635 A | 1/2003 |
| JP | A-2000-127930 | 5/2000 |
| JP | A-2000-264278 | 9/2000 |

* cited by examiner

*Primary Examiner*—Christopher P. Schwartz
(74) *Attorney, Agent, or Firm*—Greenblum & Bernstein, P.L.C.

(57) ABSTRACT

A control unit 10 controls brake forces of brake systems of a pair of brake operation elements L1, L2 operated independently to perform an anti-lock brake control for eliminating a locked state of a wheel. The control unit 10 applies the brake force to one of the wheel brakes B1, B2 of the brake system which differs from the brake system of the operated brake operation element when the brake operation elements L1, L2 is operated. When one or both of the brake operation elements L1, L2 are operated and so the wheel likely falls in a locked state, the control unit 10 performs an anti-lock brake control on the brake system of the wheel likely falling in the locked state and also performs a brake force application control on the other brake system which is different from the brake system of the wheel likely falling in the locked state.

22 Claims, 6 Drawing Sheets

VEHICULAR BRAKE CONTROL APPARATUS AND CONTROL METHOD THEREFOR

The present invention claims foreign priority to Japanese patent applications No. P.2005-076971, filed on Mar. 17, 2005, and No. P.2006-068857, filed on Mar. 14, 2006, the contents of which are incorporated herein by reference.

BACKGROUND OF THE INVENTION

1. Field of the Invention

The present invention relates to a vehicular brake control apparatus and a control method therefor and, in particular, relates to a vehicular brake control apparatus and a control method therefor capable of being mounted mainly on a vehicle of a bar handle type such as an auto-tricycle, auto-bicycle, or all-terrain vehicle (ATV)

2. Description of the Background Art

Conventionally, there is known a vehicular brake control apparatus capable of operating brakes by electrically controlling brake fluid pressure of the vehicle (see Japanese Patent Unexamined Publications Nos. JP-A-2000-127930 and JP-A-2000-264278, for example).

The vehicular brake control apparatus disclosed in each of the publications is configured in a manner that the brake controls of the front and rear wheels of an auto-bicycle can be performed independently and also can be performed in an interlocked manner between the front and rear wheels.

In each of these conventional brake control apparatuses for vehicles, the brake operations of the front and rear wheels are performed in an interlocked manner based on the operation pressure of a brake operation unit, whereby the interlocking brake operation in which the brake operations of the front and rear wheels are performed in the interlocked manner may be performed even in a running state where none of the front wheel and the rear wheel are locked and so a normal brake operation is to be performed. Thus, in such the conventional brake control apparatus, unlike the conventional bar handle type vehicle, the brake operations of the front and rear wheels can not be performed independently based on a driver's intention, so that a good brake feeling can not be obtained. Further, a sporty running etc. fitting for a driver's intention can be not realized due to such the interlocking brake operation.

On the other hand, in such a running state where the front or rear wheel is locked at the time of the brake operation, it is desirable to perform the brake operations of the rear and front wheels in the interlocked manner so as to place the behavior of the vehicle in a stable state.

SUMMARY OF THE INVENTION

Accordingly, an object of the invention is to provide a vehicular brake control apparatus and a control method therefor which can obtain good brake feeling and also place the behavior of the vehicle in a stable state.

In order to achieve the above mentioned object, according to a first aspect of the present invention, there is provided a vehicular brake control apparatus; comprising:

at least a pair of brake operation elements operated independently;

brake systems coupled to the pair of brake operation elements, respectively; and a control unit which controls the brake systems, wherein the control unit controls in such a manner that:

when one of the pair of brake operation elements is operated and one wheel corresponding to one of the brake systems corresponding to the one operated brake operation element likely falls into a locked state, the control unit performs an anti-lock brake control on the brake system of the operated brake operation element, and the control unit also performs a brake force application control so as to apply brake force to the other of the brake systems which is different from the one brake system subjected to the anti-lock brake control.

According to the first aspect of the present invention, the wheels of the respective brake systems are independently applied with the brake forces in accordance with the operations of the at least a pair of brake operation elements, respectively. Further, when one of the wheels corresponding to the brake system corresponding to one of the operated brake operation elements likely falls into the locked state due to the independent operation of the operated brake operation elements, the control unit performs the anti-lock brake control on the brake system of the one wheel and also applies the brake force to the brake system which is different from the brake system subjected to the anti-lock brake control. That is, until the one wheel likely falls in the locked state, the braking operation according to the independent operation of one of the pair of brake operation elements can be performed. In contrast, when the one wheel likely falls in the locked state, the one wheel is subjected to the anti-lock brake control and the wheel of the brake system different from the brake system of the one wheel is also applied with the brake force in an interlocked manner. Thus, in the running state where the locked state does not occur and so the normal brake operation is performed, the brake operation according to the independent operation of one of the pair of brake operation elements can be performed. Thus, like the conventional bar handle type vehicle, the brake operations of the front and rear wheels can be performed independently based on a driver's intention, so that a good brake feeling can be obtained. Further, a sporty running etc. fitting for a driver's intention can be realized.

On the other hand, in the running state where the locked state occurs at the wheel of the brake system due to the independent operation of one of the pair of brake operation elements, the brake system of the wheel likely falling into the locked state is subjected to the anti-lock brake control and the brake system different from the brake system of the wheel is also applied with the brake force in an interlocked manner. Thus, the respective brake systems are subjected to the brake operations so that the behavior of the vehicle is stable. Therefore, the brake operation capable of giving a driver a sense of security can be realized.

According to a second aspect of the present invention, there is provided a vehicular brake control apparatus, comprising:

at least a pair of brake operation elements operated independently;

brake systems coupled to the pair of brake operation elements, respectively; and a control unit which controls the brake systems, wherein the control unit controls in such a manner that:

when both of the pair of brake operation elements is operated and one wheel corresponding to one of the brake systems corresponding to the one of the brake operation elements likely falls into a locked state, the control unit performs an anti-lock brake control on the brake system which is coupled to the wheel falling into the locked state, and the control unit also performs a brake force application control so as to apply brake force to the other of the brake systems which is different from the one brake system subjected to the anti-lock brake control.

According to the second aspect of the present invention, the wheels of the respective brake systems are independently applied with the brake forces in accordance with the operations of the at least a pair of brake operation elements, respectively. Further, when one of the wheels corresponding to the brake system corresponding to one of the operated brake operation elements likely falls into the locked state due to the operations of both the pair of brake operation elements, the control unit performs the anti-lock brake control on the brake system of the one wheel and also applies the brake force to the brake system which is different from the brake system subjected to the anti-lock brake control. That is, until the one wheel likely falls in the locked state, the braking operation according to the operations of both the pair of brake operation elements can be performed. In contrast, when the one wheel likely falls in the locked state, the one wheel is subjected to the anti-lock brake control and the wheel of the brake system different from the brake system of the one wheel is also applied with the brake force in an interlocked manner. Thus, in the running state where the locked state does not occur and so the normal brake operation is performed, the brake operation according to the operations of both the pair of brake operation elements can be performed. Thus, like the conventional bar handle type vehicle, the brake operations of the front and rear wheels can be performed independently based on a driver's intention, so that a good brake feeling can be obtained. Further, a sporty running etc. fitting for a driver's intention can be realized.

The brake control apparatus according to the invention preferably further comprising:

a slip ratio calculating unit which calculates a slip ratio of the wheel, wherein the control unit performs the anti-lock brake control and the brake force application control when the slip ratio calculated by the slip ratio calculating unit reaches a predetermined value or more.

According to the present invention, the control unit performs the anti-lock brake control and applies the brake force when the slip ratio calculated by the slip ratio calculating unit reaches the predetermined value or more, the degradation of the behavior of the vehicle can be surely prevented.

The vehicular brake control apparatus according to the present invention, it is preferable that when a wheel corresponding to the other of the brake systems on which the brake force application control is performed likely falls into a locked state, the control unit performs an anti-lock brake control on the other of the brake systems.

According to the brake control apparatus thus configure, when the wheel corresponding to the other of the brake systems applied with the brake force likely falls into the locked state, the other of the brake systems is subjected to the anti-lock brake control. Thus, the degradation of the behavior of the vehicle can be surely prevented.

Further, according to a seventh aspect of the present invention, there is provided a control method for a brake control apparatus which comprises a pair of brake operation elements and brake systems coupled to the pair of brake operation elements, respectively, the control method being performed when one of the pair of brake operation elements is operated and one wheel corresponding to one of the brake systems corresponding to the one operated brake operation element likely falls into a locked state, the control method comprising the steps of:

performing an anti-lock brake control on the brake system of the operated brake operation element; and applying a brake force to the other of the brake systems which is different from the one brake system subjected to the anti-lock brake control.

In short, according to the control method of the invention, the control method is characterized in that, when one of the brake operation element is solely operated and the anti-lock brake control is performed on the wheel corresponding to the brake system of the operated operation element, as well as the anti-lock brake control on the wheel, the brake force is interlockingly applied to the other wheel of the brake system, which is coupled to the operation element other than the operated operation element.

According to this control method, when a normal running state in which the anti-lock brake control is not performed, the normal braking operation is allowed. On the other hand, in a running state where the wheel likely falls into the locked state, the brake force is applied to the brake system of the wheel which is other than the wheel to which the anti-lock brake control performed, to thereby contribute to stabilize a behavior of the vehicle.

Furthermore, according to an eighth aspect of the present invention, there is provided a control method for a brake control apparatus which comprises a pair of brake operation elements and brake systems coupled to the pair of brake operation elements, respectively, the control method being performed when both of the pair of brake operation elements is operated and one wheel corresponding to one of the brake systems corresponding to the one of the brake operation elements likely falls into a locked state, the control method comprising the steps of;

performing an anti-lock brake control on the brake system which is coupled to the wheel falling into the locked state; and applying brake force to the other of the brake systems which is different from the one brake system subjected to the anti-lock brake control.

In short, according to the control method of the invention, the control method is characterized in that, when both of the brake operation elements are operated and the anti-lock brake control is performed on one of the wheel of the brake system, as well as the anti-lock brake control on the one wheel, the brake force is applied to the other wheel interlockingly.

According to this control method, when the normal running state in which the anti-lock brake control is not performed, the normal braking operation is allowed. On the other hand, in the running state where the wheel likely falls into the locked state, the brake force is interlockingly applied to the brake system of the wheel which is other than the wheel to which the anti-lock brake control performed, to thereby contribute to stabilize the behavior of the vehicle.

According to the brake control apparatus and the control method therefore according to the invention, a good brake feeling can be obtained and the behavior of the vehicle can be stabilized.

DETAILED DESCRIPTION OF THE PREFERRED EMBODIMENTS

Figure 1:
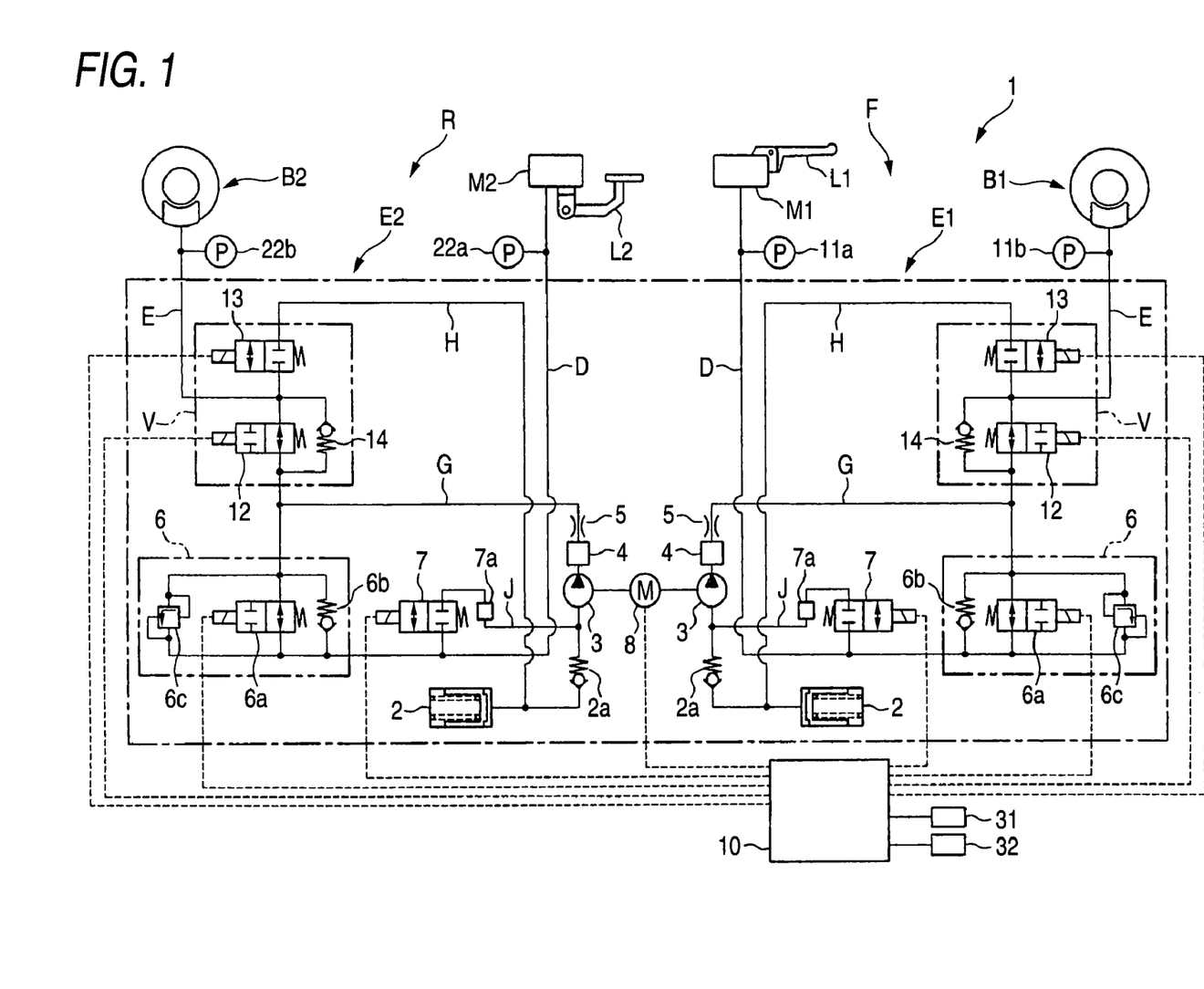
FIG. 1 is a brake fluid pressure circuit diagram showing a vehicular brake control apparatus according to an embodiment of the invention.
Figure 2:
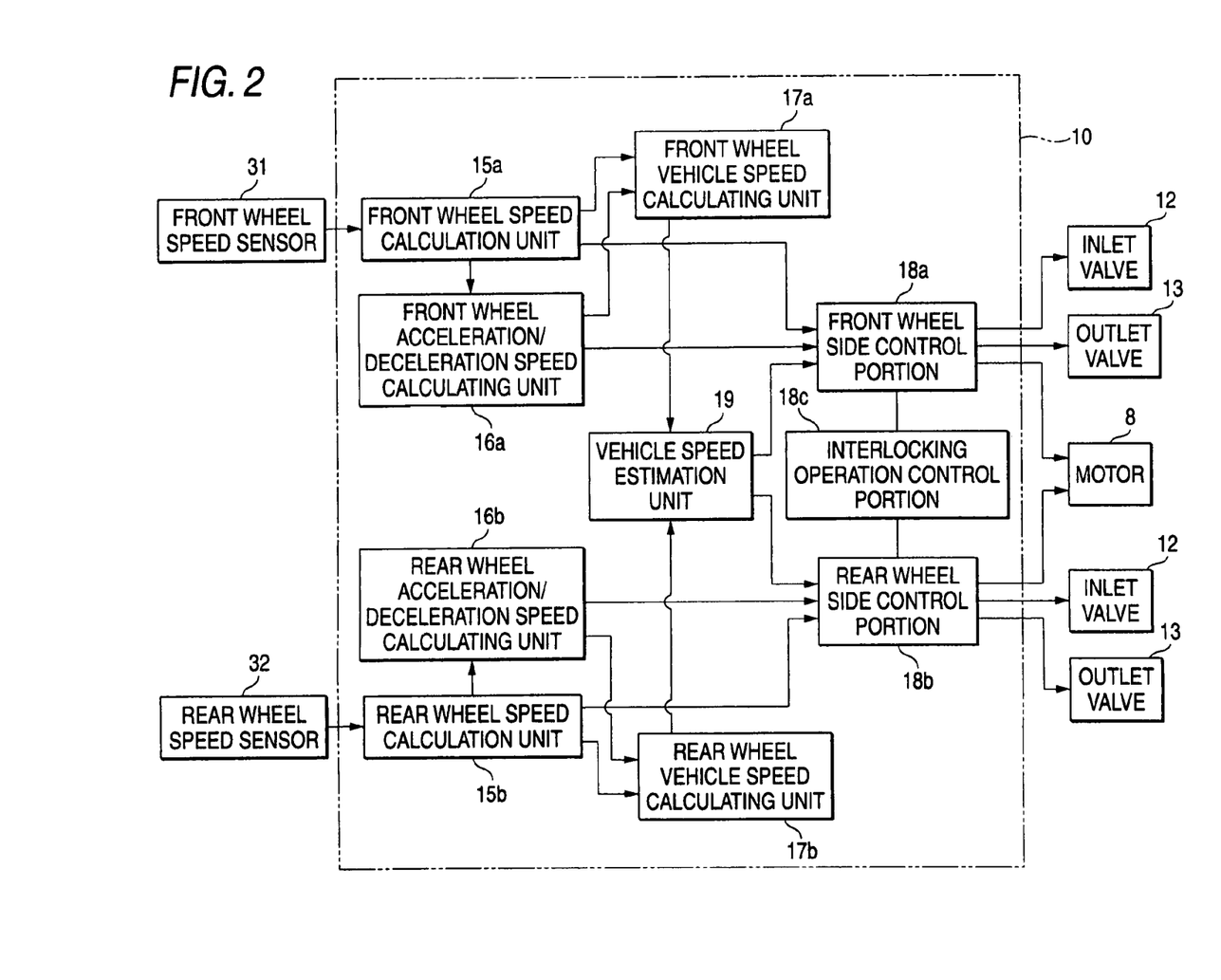
FIG. 2 is a block diagram showing the main configuration of the control apparatus.

Hereinafter, the best mode for carrying out the invention will be explained in detail with reference to the accompanying drawings. In the explanation, the same constituent elements are represented by the same signs and the duplicated explanation thereof will be omitted. In the drawings to be referred to, FIG. 1 is a brake fluid pressure circuit diagram showing a vehicular brake control apparatus according to an embodiment of the invention, and FIG. 2 is a block diagram showing the main configuration of the control apparatus.

A brake control apparatus 1 is suitably used for a vehicle of a bar handle type such as an auto-tricycle, auto-bicycle, or all-terrain vehicle (ATV) and suitably controls a brake force (by means of brake fluid pressure) applied to the front wheel and the rear wheel of a not-shown vehicle. Hereinafter, the explanation will be made as to an example where the brake control apparatus is applied to an auto-bicycle. As shown in FIG. 1, the brake control apparatus 1 is configured to include two brake systems. One of the brake systems is for a front wheel side F and the another is for a rear wheel side R. Further the brake control apparatus 1 includes a control device 10 for suitably controlling respective kinds of parts provided at the two brake systems. The brake system for the front wheel side F includes a brake fluid pressure adjusting unit E1 which can adjust brake fluid pressure of a front wheel brake B1 and which is provided between a master cylinder M1 for outputting fluid pressure according to the operation of a brake lever L1 serving as a brake operation element and the front wheel front wheel brake B2 attached to the front wheel of the not-shown auto-bicycle. Further, the brake system for the rear wheel side R includes a brake fluid pressure adjusting unit E2 which can adjust brake fluid pressure of a rear wheel brake B2 and which is provided between a master cylinder M2 for outputting fluid pressure according to the operation of a lever L2 serving as a brake operation element and the rear wheel brake B2 attached to the rear wheel of the not-shown auto-bicycle. In this manner, although the brake control apparatus 1 is configured by the two brake systems of the front wheel brake B1 and the rear wheel brake B2, since each of the two brake systems is configured by the same configuration, the following explanation will mainly be made as to the brake system of the front wheel brake B1 and the brake system of the rear wheel brake B2 will be explained suitably.

The master cylinder M1 includes a not-shown cylinder to which a not-shown brake fluid tank chamber for accommodating the brake fluid therein is coupled. Within the cylinder, a not-shown rod piston is assembled which is slidably moved in the axial direction of the cylinder by the operation of the lever V1 to flow out the brake fluid. The master cylinder M2 of the rear wheel side R differs from the master cylinder of the front side in a manner that a brake pedal L2 is coupled thereto. Fluid pressure detection sensors 11a, 22a for detecting the brake fluid pressures are provided at the fluid pressure paths from the master cylinders M1, M2, respectively. The control device 10 fetches the measured results of the fluid pressure detection sensors 11a, 22a at any time to determine whether or not the brake lever L1 or the brake pedal L2 is operated.

The brake fluid pressure adjusting unit E1 is provided with a reservoir 2, a pump 3, a damper 4, an orifice, a regulator and a suction valve 7, and further provided with a motor 8 which is commonly used for driving the pumps 3 of the front wheel brake B1 and the rear wheel brake B2. Further, the brake fluid pressure adjusting unit E1 is provided with a control valve unit V for controlling the brake fluid pressure applied to the front wheel brake B1.

In the following description, a fluid path to the regulator 6 via the master cylinder M1 (M2) is called "an output fluid pressure path D" and a fluid path to the front wheel brake B1 from the regulator 6 is called "a wheel fluid pressure path E". Further, a fluid path to the pump 3 from the output fluid pressure path D is called "a suction fluid pressure path J", a path to the wheel fluid pressure path E from the pump 3 is called "an ejecting fluid pressure path G" and a path to the reservoir 2 from the wheel fluid pressure path E is called "an opening path H".

The control valve unit V has a function of switching among a state of interrupting or closing the opening path H while opening the wheel fluid pressure path E, a state of opening the opening path H while interrupting or closing the wheel fluid pressure path E and a state of interrupting or closing the opening path H while interrupting or closing the wheel fluid pressure path E. The control valve unit includes an inlet valve 12, an outlet valve 13 and a check valve 14.

The inlet valve 12 is a normally-open type electromagnetic valve provided at the wheel fluid pressure path E. The inlet valve 12 is normally opened and so allows the brake fluid pressure to be transmitted to the front wheel brake B1 via the output fluid pressure path D from the master cylinder M1. Further, since the inlet valve 12 is closed (anti-lock brake control) by the control device 10 when the front wheel is likely locked, the brake fluid pressure transmitted to the front wheel brake B1 from the master cylinder M1 is interrupted.

The outlet valve 13 is a normally-close type electromagnetic valve provided between the wheel fluid pressure path E and the opening path H. Although the outlet valve 13 is normally closed, the outlet valve is opened (anti-lock brake control) by the control device 10 when the front wheel is likely locked thereby to release the brake fluid pressure acting on the front wheel brake B1 to the reservoir 2.

The check valve 14 is coupled in parallel to the inlet valve 12. The check valve 14 acts to allow the brake fluid to flow only toward the regulator 6 side from the front wheel brake B1 side. When the input from the brake lever L1 is released, even if the inlet valve 12 is placed in the closed state, this check valve allows the brake fluid to flow toward the regulator 6 side from the front wheel brake B1 side.

The reservoir 2 is provided at the opening path H and has a function of absorbing the brake fluid pressure released by the opening of the outlet valve 13. A check valve 2a for allowing the brake fluid to flow only toward the pump 3 side from the reservoir 2 side is disposed between the reservoir 2 and the suction fluid pressure path J.

The pump 3 is disposed between the suction fluid pressure path J communicating with the output fluid pressure path D and the ejecting fluid pressure path G communicating with the wheel fluid pressure path E. As described above, this pump has a function of sucking the brake fluid reserved in the reservoir 2 and ejecting the brake fluid thus sucked to the ejecting fluid pressure path G. The brake fluid is transmitted to the wheel fluid pressure path E by such the operation of the pump 3. Further, at the time of the anti-lock brake control, the pressures within the output fluid pressure path D and the wheel fluid pressure path E which are reduced by the suction of the brake fluid by the reservoir 2 are recovered. After the completion of the brake operation by the brake lever L1, a cut valve 6a described later allows the brake fluid to flow into the output fluid pressure path D from the wheel fluid pressure path E, whereby the brake fluid having flown into the wheel fluid pressure path E returns to the master cylinder M1 via the output fluid pressure path D.

The damper 4 and the orifice 5 cooperate to attenuate the pulsation of the pressure of the brake fluid ejected from the pump 3 and the pulsation generated by the operation of the regulator 6 described later.

The regulator 6 has a function of switching between a state of allowing and a state of interrupting the brake fluid to flow into the wheel fluid pressure path E from the output fluid pressure path D, and also has a function of adjusting the brake fluid pressure of the wheel fluid pressure path E and the ejecting fluid pressure path G to a value equal to or lower than a setting value when the brake fluid is interrupted from flowing into the wheel fluid pressure path E from the output fluid pressure path D/ The regulator is configured by the cut valve 6a, a check valve 6b and a relief valve 6c.

The cut valve 6a is a normally-open type electromagnetic valve disposed between the output fluid pressure path D communicating with the master cylinder M1 ane the wheel fluid pressure path E communicating with the front wheel brake B1. This cut valve switches between the state of allowing the brake fluid to flow into the wheel fluid pressure path E from the output fluid pressure path D and the state of interrupting the brake fluid from flowing into the wheel fluid pressure path E from the output fluid pressure path D. The cut valve 6a is controlled by the control device 10 so as to be interrupted (closed) at the time of the operation of the pump 3 thereby to interrupt the fluid pressure from the master cylinder M1 from being directly applied to the wheel fluid pressure path E from the output fluid pressure path D. Accordingly, the brake fluid is absorbed by the pump 3 via the suction fluid pressure oath J (the suction valve 7) from the output fluid pressure path D as described later. Further, the cut valve 6a is demagnetized in accordance with the stop of the pump 3 and so placed in an opened state. Thus, the brake fluid is returned to the output fluid pressure path D via the cut valve 6a from the wheel fluid pressure path E.

The check valve 6b is coupled in parallel to the cut valve 6a. The check valve 6b serves to allows the brake fluid to flow only into the wheel fluid pressure path E from the output fluid pressure path D, and allows the brake fluid to flow into the wheel fluid pressure path E from the output fluid pressure path D even if the cut valve 6a is locked to a closed state due to a failure etc.

The relief valve 6c is coupled in parallel to the cut valve 6a and is opened when the brake fluid pressure of the wheel fluid pressure path E and the ejecting fluid pressure path G reaches the setting value or more.

The suction valve 7 is a normally-closed type electromagnetic valve disposed at the suction fluid pressure path J and switches between a state of opening the suction fluid pressure path J and a state of interrupting or closing the suction fluid pressure path J. The suction valve 7 is opened by the control device 10 in accordance with the operation of the pump 3, whilst interrupted (closed) by the control device in accordance with the stop of the pump 3. A storage chamber 7a for reserving the brake fluid is provided at the suction fluid pressure path J.

The control device 10 mainly controls the operations of the inlet valve 12 and the outlet valve 13 of the control valve unit V and the motor 8, and independently adjusts and controls the brake forces of the two brake systems to eliminate the locking tendency of the front and rear wheels thereby to perform the anti-lock brake control. Further, the control device performs a control that when one of the brake lever L1 and the brake pedal L2 is operated, the brake force is applied to the front wheel brake B1 or the rear wheel brake B2 of the brake system on the side different from the operated side. Further, for example, when the front wheel likely falls into the locked state by the operation of the brake lever L1, the control device 10 performs the anti-lock brake control to adjust and control the brake force of the brake system of the front wheel side F and also applies the brake force to the rear wheel brake B2 of the brake system of the rear wheel side R. Such the control device 10 is provided with a front wheel speed sensor 31 disposed in a fixed manner in opposite to the front wheel side Face of a pulsar gear fixed to the not-shown front wheel and also provided with a sensor 32 disposed in a fixed manner in opposite to the side face of a pulsar gear fixed to the not-shown rear wheel. The control device 10 controls the operations of the inlet valve 12 and the outlet valve 13 of the control valve unit V and the motor 8 in accordance with the outputs of the fluid pressure detection sensors 11a, 22a and the outputs of the fluid pressure detection sensors 11b, 22b provided at the wheel fluid pressure path E.

The explanation will be made with reference to FIG. 2 while referring to FIG. 1 as to the configuration of parts of the control device 10 relating to the anti-lock brake control. The control device 10 includes a front wheel speed calculation unit 15a, a front wheel acceleration/deceleration speed calculating unit 16a, a front wheel vehicle speed calculating unit 17a and a front wheel side control portion (slip rate calculating unit) 18a in correspondence to the brake fluid pressure adjusting unit E1 of the front wheel side F and further includes a rear wheel speed calculation unit 15b, a rear wheel acceleration/deceleration speed calculating unit 16b, a rear wheel vehicle speed calculating unit 17b and a rear wheel side control portion 18b (slip rate calculating unit) in correspondence to the brake fluid pressure adjusting unit E2 of the rear wheel side R. Further, the control device includes an interlocking operation control portion 18c and a vehicle speed estimation unit 19 common to the both brake fluid pressure adjusting unit E1, E2. In the control device 10, since the configuration of the portion corresponding to the front wheel side F is same as that of the portion corresponding to the rear wheel side R, the explanation will be made hereinafter mainly as to the front wheel side F.

The front wheel speed calculation unit 15a receives the output signal from the front wheel speed sensor 31 to calculate a front wheel speed. The front wheel acceleration/ deceleration speed calculating unit 16a differentiates the front wheel speed obtained by the front wheel speed calculation unit 15a to obtain the acceleration/deceleration speed of the front wheel. The front wheel vehicle speed calculating unit 17a calculates a front wheel vehicle speed based on the front wheel speed obtained by the front wheel speed calculation unit 15a and the front wheel acceleration/deceleration speed obtained by the front wheel acceleration/deceleration speed calculating unit 16a.

The vehicle speed estimation unit 19 sets an estimated vehicle speed, which is a reference value for determining the slip ratios of the front and rear wheels, based on the vehicle speed calculated by the front wheel vehicle speed calculating unit 17a and the vehicle speed calculated by the rear wheel vehicle speed calculating unit 17b. For example, a high select value of the vehicle speed calculated by the front wheel vehicle speed calculating unit 17a and the vehicle speed calculated by the rear wheel vehicle speed calculating unit 17b is set as the estimated vehicle speed.

The front wheel side control portion 18a calculates a slip ratio based on the front wheel speed calculated by the front wheel speed calculation unit 15a, the front wheel acceleration/deceleration speed obtained by the front wheel acceleration/deceleration speed calculating unit 16a and the estimated vehicle speed obtained by the vehicle speed estimation unit 19, and determines the brake fluid pressure control value of the front wheel brake B1 based on the calculated slip ratio thereby to perform the opening/closing driving control of the inlet valve 12 and the outlet valve 13 of the control valve unit V. To be concrete, supposing that the slip ratio is SR, the front wheel speed is W and the estimated vehicle speed is SVR, the slip ratio SR is obtained from an expression of SR=(SVR−W). Further, the front wheel side control portion 18a operates and controls the motor 8 by a predetermined amount so as to execute the anti-lock brake control. To this end, the front wheel side control portion 18a sets a slip ratio to be a target value at the time of the running with the estimated vehicle speed as a target slip ratio based on the estimated vehicle speed obtained by the vehicle speed estimation unit 19. Furthermore, the front wheel side control portion calculates a deviation between the target slip ratio and the slip ratio obtained by the aforesaid manner and calculates the brake fluid pressure control value of the front wheel brake B1 in order to make the deviation close to "0" utmost thereby to drive and control the inlet valve 12 and the outlet valve 13 of the control valve unit V and the motor 8 based on the calculated brake fluid pressure control value.

The interlocking operation control portion 18c controls so as to apply the brake force to the brake system on the side where the anti-lock brake control is not performed when one of the front and rear wheels is subjected to the anti-lock brake control. For example, when the front wheel side F is subjected to the anti-lock brake control in the case where the front wheel is likely fallen into the locked state by the operation of the brake lever L1, the interlocking operation control portion 18c controls so as to apply the brake force to the rear wheel brake B2 of the brake system of the rear wheel side R.

The anti-lock brake control for the front wheel side F and the anti-lock brake control for the rear wheel side R are performed independently. Thus, when the rear wheel is likely fallen into the locked state during the process where the interlocking operation control portion 18c controls so as to apply the brake force to the rear wheel brake B2 of the brake system of the rear wheel side R, the rear wheel is also subjected to the anti-lock brake control.

Next, the operation of the brake control apparatus 1 configured in this manner will be explained in detail.

(Upon Normal Operation)

When the brake lever L1 is operated during the normal brake control state (upon normal operation) where there is no possibility that the wheels are locked the brake fluid pressure generated by the operation force of the brake lever is transmitted as it is to the front wheel brake B1 via the output fluid pressure path D of the front wheel side F to brake the front wheel. Also, the brake fluid pressure generated by the operation force of the brake pedal L2 is transmitted as it is to the rear wheel brake 32 via the output fluid pressure path D of the rear wheel side R to brake the rear wheel.

(Anti-Lock Brake Control)

When the front wheel likely falls in the locked state during the operation of the brake lever L1, the control device 10 starts the anti-lock brake control. The anti-lock brake control is performed in a manner that the control valve unit V corresponding to the wheel brake (the front wheel brake B1 or the rear wheel brake B2) of the wheel likely falling in the locked state is controlled to increase, reduce or maintain the brake fluid pressure acting on the front wheel brake B1 or the rear wheel brake B2.

Figure 3A:
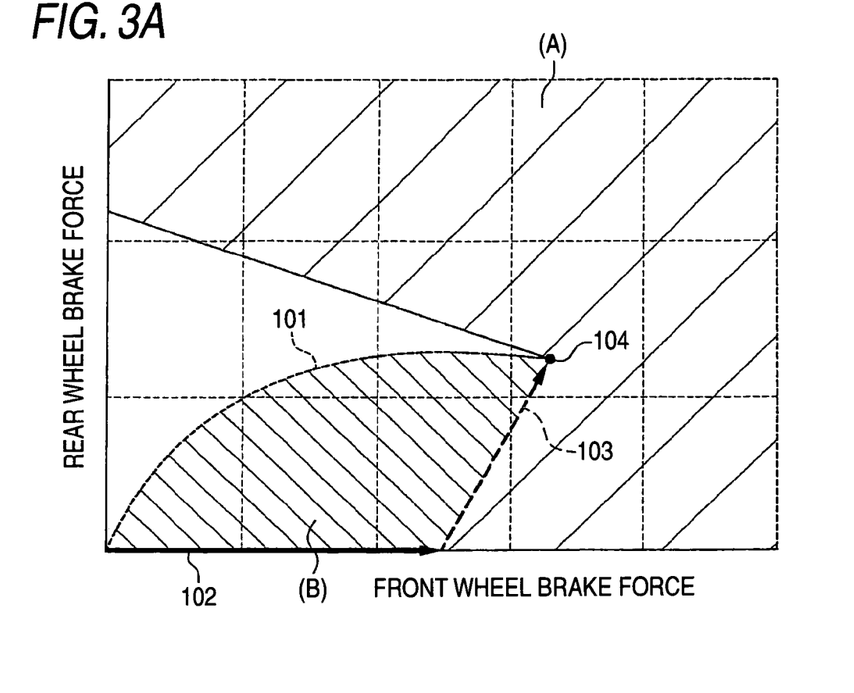
FIG. 3A is a diagram showing the brake force characteristics at a time of a constant loading state.
Figure 3B:
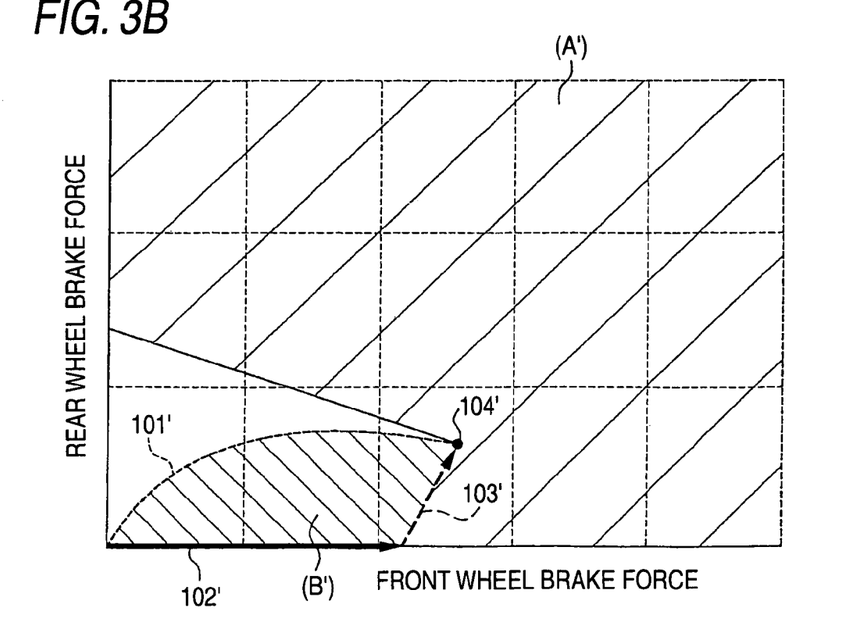
FIG. 3B is a diagram showing the brake force characteristics at a time of a light loading state.

The brake force characteristics of the front wheel and the rear wheel at the time of the anti-lock brake control will be explained with reference to FIGS. 3A, B and FIG. 1. FIGS. 3A and 3B are diagrams showing the brake force characteristics of the front wheel and the rear wheel at the time of the anti-lock brake control, wherein FIG. 3A is a diagram showing the brake force characteristics at a time of a constant loading state and FIG. 3B is a diagram showing the brake force characteristics at a time of a light loading state. First, the explanation will be made as to the brake force characteristics in the case where the front wheel likely falls in the locked state while only the brake lever L1 of the front wheel side F is operated. The constant loading state unit such a case that, when the passenger capacity is two, two persons are riding or one person is riding while loading a heavy baggage. The light loading unit such a case that, when the passenger capacity is two, one persons is riding or one person is riding while loading a light baggage.

In FIG. 3A, a horizontal axis represents the braking force of the front wheel and a vertical axis represents the braking force of the rear wheel, and a dotted curved line (shown by (101) in the figure) is an ideal brake force distribution characteristic curve. An area (A) shown by slanted lines is an area where the wheel is locked.

When the brake lever L1 is operated to supply the fluid pressure to the front wheel brake B1 via the output fluid pressure path D from the master cylinder M1 thereby to perform the brake control of only the front wheel, the brake fluid pressure of the front wheel increases and the brake force of the front wheel increases as shown by a bold arrow (102) in FIG. 3A.

When the brake fluid pressure of the front wheel further increases and the slip ratio reaches a predetermined value or more set in advance (when the front wheel brake force likely enters into the locked area (A)), the control device 10 drives and controls the control valve unit V and the regulator 6 of the front wheel side F and also operates the motor 8 to make the brake force increase rate of the front wheel brake B1 slow thereby to enter into the anti-lock brake control.

When the front wheel side F enters into the anti-lock brake control, the interlocking operation control portion 18c (see FIG. 2) of the control device 10 controls so as to apply the brake force to the rear wheel brake B2 of the brake system of the rear wheel side R where no brake operation is performed, so that the brake operation is performed as to the rear wheel brake B2 in an interlocked manner with the front wheel brake B1. That is, when the front wheel side F enters into the anti-lock brake control, the control device 10 drives and controls the control valve unit V and the regulator 6 of the front wheel side F and also operates the motor 8, so that the brake operation is performed as to the rear wheel side R in an interlocked manner with the front wheel side. Thus, as shown by a dotted arrow (103) in FIG. 3A, the rear wheel brake force also increases, and so the brake forces of the front wheel and the rear wheel move within a brake area (B) just before the brake forces of the front and rear wheels likely enter into the locked area (A). Thereafter, the rear wheel brake force increases along the dotted arrow (103). Subsequently, when the brake forces of the rear wheel exceeds the maximum brake force point (104) and likely enters into the locked area (A), the control device 10 controls so as to also enter the rear wheel side R into the anti-lock brake control.

As shown in FIG. 3B, such the control of the control device 10 is also performed in the similar manner in the brake force characteristics at the time of the light-loading state. In this case, since the load is smaller as compared with the constant-loading state, the brake forces of the front and rear wheels likely enter into a locked area (A') with a brake force smaller than that at the time of the constant-loading state, and a brake area (B') is also smaller than that of the constant-loading state. Incidentally, the locked areas (A), (A') and the brake areas (B), (B') are not fixed and may be suitably set and modified in accordance with the friction coefficient etc. of the surface of the running road.

Figure 4:
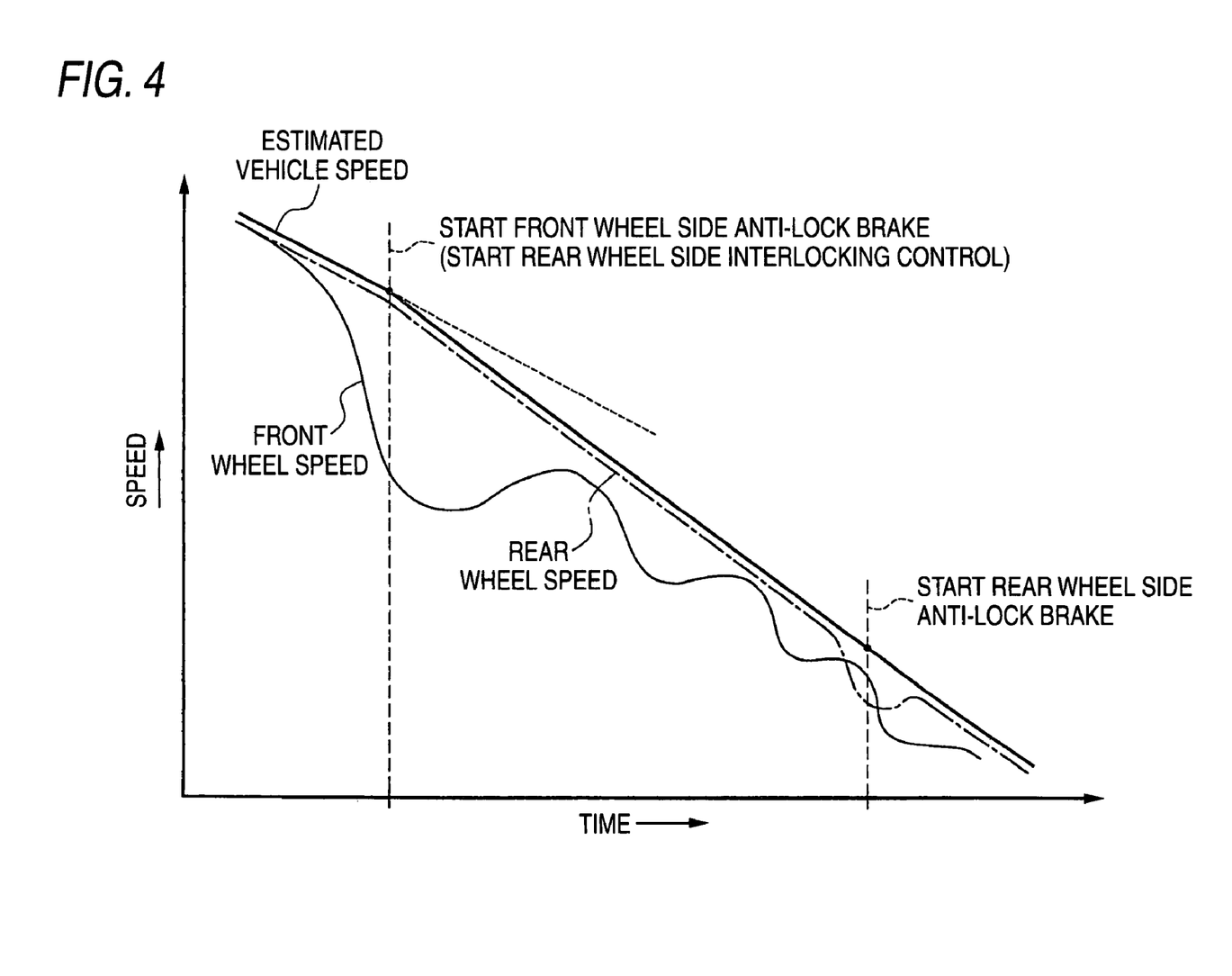
FIG. 4 is a diagram showing an example of the time variability of the wheel speeds of the front and rear wheels and the estimated vehicle speed at the time of the anti-lock brake control.

FIG. 4 is a diagram showing an example of the time variability of the wheel speeds of the front and rear wheels and the estimated vehicle speed at the time of the anti-lock brake control.

As shown in FIG. 4, when the front wheel is applied with the brake force, then the front wheel likely falls in the locked state and so the front wheel side F is subjected to the anti-lock brake control, the rear wheel side R is also applied with the brake force in the interlocking manner and hence the wheel speed of the rear wheel is also reduced. Thus, the estimated vehicle speed also reduces. Thereafter, when the rear wheel likely falls in the locked state, the rear wheel side R is also started to be subjected to the anti-lock brake control. That is, since the rear wheel side R is also applied with the brake force in the interlocking manner simultaneously when the front wheel side F is subjected to the anti-lock brake control, the speed of the rear wheel side R is reduced and also the estimated vehicle speed is reduced effectively.

Next, the explanation will be made with reference to FIGS. 5A and 5B as to the brake force characteristics when the front wheel likely falls in the locked state while only the brake pedal L2 of the rear wheel side R is operated. In these figures, like portions corresponding to those explained with reference to FIGS. 3A and 3B are marked with the same symbols.

Figure 5A:
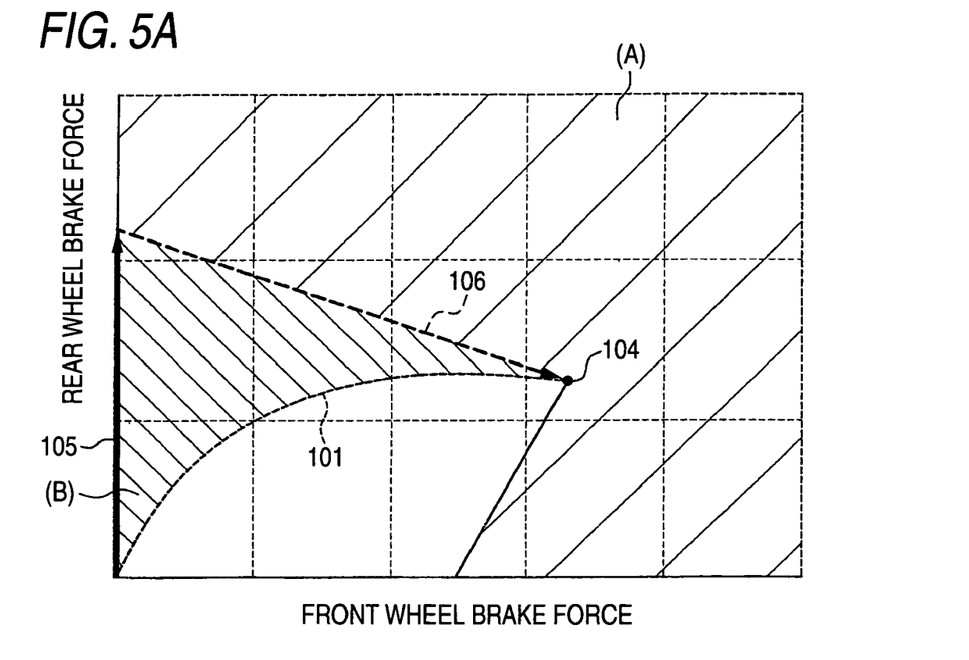
FIG. 5A is a diagram showing the brake force characteristics at a time of a constant loading state.

When the lever L2 is operated to supply the fluid pressure to the rear wheel brake B2 via the output fluid pressure path D from the master cylinder M2 thereby to perform the brake control of only the rear wheel, the brake fluid pressure of the rear wheel increases and the brake force applied to the front wheel increases as shown by a bold arrow (105) in FIG. 5A.

When the brake fluid pressure of the rear wheel further increases and the slip ratio reaches the predetermined value or more set in advance (when the rear wheel brake force likely enters into the locked area (A)), the control device 10 drives and controls the control valve unit V and also operates the motor 8 to reduce the brake force of the rear wheel brake B2 thereby to enter into the anti-lock brake control.

When the rear wheel side R enters into the anti-lock brake control, the interlocking operation control portion 18c (see FIG. 2) of the control device 10 controls so as to apply the brake force to the front wheel brake B1 of the brake system of the front wheel side F where no brake operation is performed, so that the brake operation is performed as to the front wheel brake B1 in an interlocked manner with the rear wheel brake 132. That is, when the rear wheel side R enters into the anti-lock brake control, the control device 10 drives and controls the control valve unit V and the regulator 6 of the front wheel side F and also operates the motor 8, so that the brake operation is performed as to the front wheel side F in an interlocked manner with the rear wheel side. Thus, as shown by a dotted arrow (106) in FIG. 5A, the front wheel brake force increases, and so the brake forces of the front wheel and the rear wheel move so as to be held within a brake area (B) just before the brake forces of the front and rear wheels likely enter into the locked area (A). Thereafter, the front wheel brake force increases along the dotted arrow (106). Subsequently, when the brake force of the front wheel exceeds the maximum brake force point (104) and likely enters into the locked area (A), the control device 10 controls so as to also enter the front wheel side F into the anti-lock brake control.

Figure 5B:
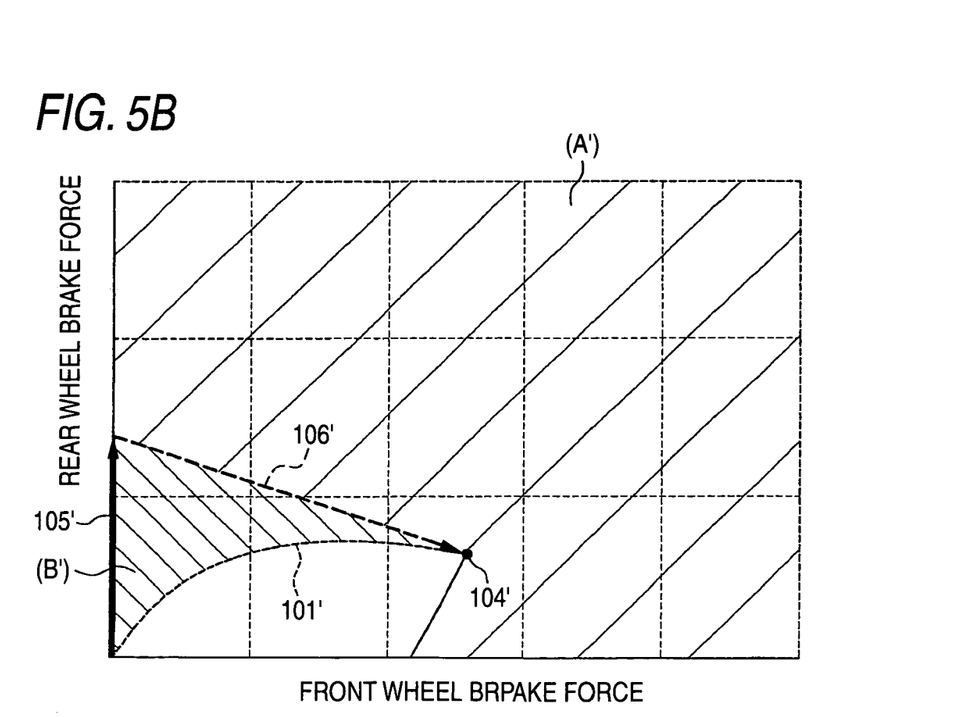
FIG. 5B is a diagram showing the brake force characteristics at a time of a light loading state.

As shown in FIG. 5B, such the control of the control device 10 is also performed in the similar manner in the brake force characteristics at the time of the light-loading state. In this case, since the load is smaller as compared with the constant-loading state, the brake forces of the front and rear wheels likely enter into a locked area (A') with a brake force smaller than that at the time of the constant-loading state, and a brake area (B') is also smaller than that of the constant-loading state. Incidentally, the locked areas (A), (A') and the brake areas (B), (B') are not fixed and may be suitably set and modified in accordance with the friction coefficient etc. of the surface of the running road.

Next, the explanation will be made with reference to FIGS. 1 and 6 as to the operation where one of the front and rear wheels likely falls in the locked state when both the brake lever L1 and the brake pedal L2 are operated and so both the front and rear wheels are applied with the brake forces from the front wheel brake B1 and the rear wheel brake B2.

Figure 6A:
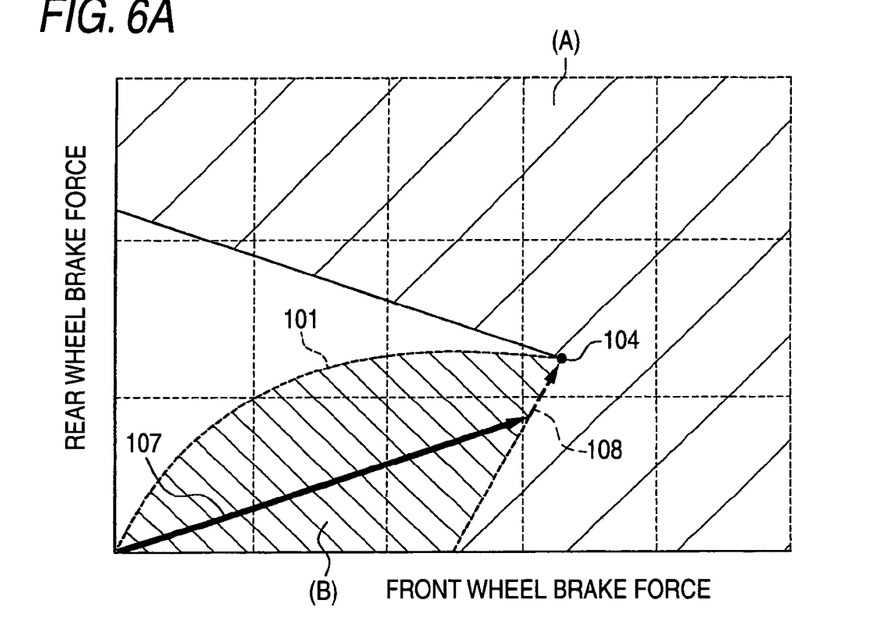
FIG. 6A is a diagram showing the brake force characteristics at the time where the front wheel likely falls in the locked state.
Figure 6B:
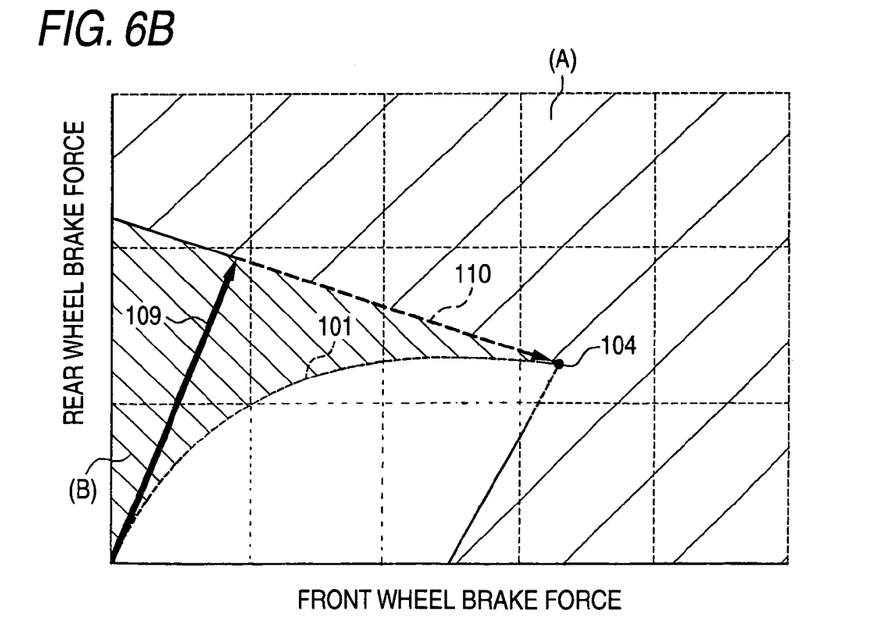
FIG. 6B is a diagram showing the brake force characteristics at the time where the rear wheel likely falls in the locked state.

FIGS. 6A and 6B are diagrams showing the brake force characteristics of the front and rear wheels at the time of the anti-lock brake control, wherein FIG. 6A is a diagram showing the brake force characteristics at the time where the front wheel likely falls in the locked state, and FIG. 6B is a diagram showing the brake force characteristics at the time where the rear wheel likely falls in the locked state. Further, FIG. 6A shows a case where the front wheel is applied with the brake force larger than that applied to the rear wheel, whilst FIG. 6B shows a case where the rear wheel is applied with the brake force larger than that applied to the front wheel.

As shown in FIG. 6A, when both the brake lever L1 and the brake pedal L2 are operated in a state where the front wheel is applied with the brake force larger than that applied to the rear wheel, the fluid pressure is applied to the front wheel brake 31 and the rear wheel brake B2 via the output fluid pressure paths D, D thereby to brake the front and rear wheels, respectively. In this case, the brake fluid pressures of the front and rear wheels increase and the brake forces applied to the front and rear wheels increase as shown by a bold arrow (107) in FIG. 6A.

When the brake fluid pressures of the front and rear wheels further increase and the slip ratio of the front wheel reaches the predetermined value or more set in advance (when the front wheel brake force likely enters into the locked area (A)), the control device 10 drives and controls the control valve unit V and the regulator 6 of the front wheel side F and also operates the motor 8 to reduce the increase rate of the brake force of the front wheel brake B1 thereby to enter into the anti-lock brake control.

When the front wheel side E enters into the anti-lock brake control, the control device 10 drives and controls the control valve unit V and the regulator 6 of the rear wheel side R and also operates the motor 8, so that the brake operation is performed as to the rear wheel side R in an interlocked manner with the front wheel side F. Thus, the brake force in an interlocked manner with the front wheel brake B1 is added to the rear wheel brake B2 which has been braked and operated heretofore independently by the brake pedal L2, so that the rear wheel brake force increases by the added brake force as shown by a dotted arrow (108) in FIG. 6A. Thus, the brake forces of the front wheel and the rear wheel move so as to be held within a brake area (B) just before the brake forces of the front and rear wheels likely enter into the locked area (A) Thereafter, the rear wheel brake force increases along the dotted arrow (108). Subsequently, when the brake force of the front wheel exceeds the maximum brake force point (104) and likely enters into the locked area (A), the control device 10 controls so as to also enter the rear wheel side R into the anti-lock brake control.

Further, as shown in FIG. 6B, when both the brake lever L1 and the brake pedal L2 are operated in a state where the rear wheel is applied with the brake force larger than that applied to the front wheel, the brake fluid pressures of the front and rear wheels increase and the brake forces applied to the front and rear wheels increase as shown by a bold arrow (109) in FIG. 6B.

When the brake fluid pressures of the front and rear wheels further increase and the slip ratio of the rear wheel reaches the predetermined value or more set in advance (when the rear wheel brake force likely enters into the locked area (A)) the control device 10 the brake force of the rear wheel brake BS thereby to enter into the anti-lock brake control.

When the rear wheel side R enters into the anti-lock brake control, the control device 10 drives and controls the control valve unit V and the regulator 6 of the front wheel side F and also operates the motor 8, so that the brake operation is performed as to the front wheel side F in an interlocked manner with the rear wheel side R. Thus, the brake force in an interlocked manner with the rear wheel brake B2 is added to the front wheel brake 31 which has been braked and operated heretofore independently by the brake lever L1, so that the front wheel brake force increases as shown by a dotted arrow (110) in FIG. 6G. Thus, the brake forces of the front wheel and the rear wheel move within a brake area (3) just before the brake forces of the front and rear wheels likely enter into the locked area (A).

Thereafter, the front wheel brake force increases along the dotted arrow (110). Subsequently, when the brake force of the front wheel exceeds the maximum brake force point (104) and likely enters into the locked area (A), the control device 10 controls so as to also enter the front wheel side into the anti-lock brake control The explanation will be made again with reference to FIG. 1. In the case of reducing the brake fluid pressure acting on the front wheel brake B1 at the time of the anti-lock brake control, the control valve unit V interrupts the wheel fluid pressure path E and opens the opening path H. That is, the control device 10 energizes the inlet valve 12 to place it in the closed state and also energizes the outlet valve 13 to place it in the opened state. Thus, the brake fluid of the wheel fluid pressure path E communicating with the front wheel brake B1 flows into the reservoir 2 via the opening path H, whereby the brake fluid pressure having been acting on the front wheel brake B1 reduces.

In the case of maintaining the brake fluid pressure acting on the front wheel brake B1 to a constant value, the control valve unit V interrupts the wheel fluid pressure path E and the opening path H. That is, the control device 10 energizes the inlet valve 12 to place it in the closed state and also demagnetizes the outlet valve 13 to place it in the closed state. Thus, the brake fluid is confined within the fluid path enclosed by the front wheel brake B1, the inlet valve 12 and the outlet valve 13, whereby the brake fluid pressure acting on the front wheel brake B1 is kept to a constant value.

Further, in the case of increasing the brake fluid pressure acting on the front wheel brake B1, the control valve unit V opens the wheel fluid pressure path E and interrupts the opening path H. That is, the control device 10 demagnetizes the inlet valve 12 to place it in the opened state and also demagnetizes the outlet valve 13 to place it in the closed state. Thus, the brake fluid flows out to the ejecting fluid pressure path G by the operation of the pump 3 acts on the wheel fluid pressure path E via the inlet valve 12, whereby the brake fluid pressure acting on the front wheel brake 31 increases.

In the case where the brake fluid pressure of the wheel fluid pressure path E and the ejecting fluid pressure path G reaches the set value or more due to the brake control etc. at the time of non-operation of the brake lever L1, the brake fluid within the wheel fluid pressure path E and the ejecting fluid pressure path G is released to the output fluid pressure path D by the operation of the relief valve 6c. As a result, such a phenomenon is prevented from occurring that an excessive brake fluid pressure acts on the front wheel brake B1.

Further, since the pulsation occurring at the ejecting fluid pressure path G etc. due to the operation of the regulator 6 is absorbed and suppressed by the cooperation of the damper 4 and the orifice 5, the operation sound generated by the pulsation can be made small.

According to the brake control apparatus 1 as described above, the front wheel brake B1 and the rear wheel brake B2 coupled to the respective brake systems are independently operated to apply the brake forces in accordance with the operations of the brake lever L1 and the brake pedal L2, respectively. Further, when one of the front and rear wheels likely falls into the locked state due to the operation of one or both of the brake lever L1 and the brake pedal L2, the control device 10 performs the anti-lock brake control as to the brake force of the brake system of the one wheel and also applies the brake force to the front wheel brake B1 or the rear wheel brake B2 of the brake system which is different from the brake system of the one wheel likely falling into the locked state. That is, until the one wheel likely falls in the locked state, the braking operation according to the independent operation of one of the brake lever L1 and the brake pedal L2 or the braking operation according to the operations of both the brake lever L1 and the brake pedal L2 can be performed. In contrast, when the one wheel likely falls in the locked state, the one wheel is subjected to the anti-lock brake control and the wheel of the brake system different from the brake system of the one wheel is also applied with the brake force in an interlocked manner. Thus, in the running state where the locked state does not occur and so the normal brake operation is performed, the brake operation according to the independent operation of one of the brake lever L1 and the brake pedal L2 or the braking operation according to the operations of both the brake lever L1 and the brake pedal L2 can be performed. Thus, like the conventional bar handle type vehicle, the brake operations of the front and rear wheels can be performed independently based on a driver's intention, so that a good brake feeling can be obtained. Further, a sporty running etc. fitting for a driver's intention can be realized.

On the other hand, in the running state where the locked state occurs at one of the front and rear wheels due to the brake operation, the one wheel likely falling into the locked state is subjected to the anti-lock brake control and the wheel of the brake system different from the brake system of the one wheel is also applied with the brake force in an interlocked manner. Thus, the respective wheels are subjected to the brake operations so that the behavior of the vehicle is stable. Therefore, the brake operation capable of giving a driver a sense of security can be realized.

Further, since the brake control apparatus is configured in a manner that the front wheel side control portion 18a (the rear wheel side control portion 18b) for calculating the slip ratio of the corresponding wheel is provided and the control device 10 performs the anti-lock brake control and applies the brake force when the slip ratio calculated by the front wheel side control portion 18a reaches the predetermined value or more, the degradation of the behavior of the vehicle can be surely prevented.

Furthermore, when the wheel different from the wheel subjected to the anti-lock brake control, for example, the rear wheel side R in the case where the front wheel is subjected to the anti-lock brake control likely falls in the locked state, the control device 10 also performs the anti-lock brake control as to the rear wheel side R to adjust and control the brake force of the brake system of the rear wheel. Thus, the degradation of the behavior of the vehicle can be surely prevented.

As described above, although the explanation is made as to the embodiment of the invention, the invention is not limited to the aforesaid embodiment and so can be suitably modified.

For example, the invention may be configured in a manner that when the rear and front wheels are subjected to the brake control in an interlocked manner, the control state etc. of the wheel to be subjected to the anti-lock brake control is detected and the rear and front wheels are subjected to the brake operation so that the preset preferable brake force distribution is performed. Further, the brake control apparatus according to the embodiment can be applied to such a vehicle in which the output fluid pressure path D communicating to the front wheel brake B1 from the brake lever L1 is opened or interrupted by a separation valve and the control operation according to the fluid pressure of the brake fluid on the front wheel brake B1 side can be performed.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicular brake control apparatus, comprising:
   at least a pair of brake operation elements independently operated;
   brake systems coupled to the pair of brake operation elements, respectively; and
   a control unit which controls the brake systems,
   wherein:
   when a first of the pair of brake operation elements is operated and one wheel corresponding to the brake system of the first brake operation element likely falls into a locked state,
   the control unit performs an anti-lock brake control on the brake system of the first brake operation element,
   the control unit also performs a brake force application control so as to apply brake force to the other of the brake systems which is different from the brake system subjected to the anti-lock brake control, and
   during a normal control where there is no possibility that wheels are locked, the brake systems are independently controlled and a respective brake fluid pressure generated by the pair of brake operation elements is transmitted as it is to respective wheel brakes.

2. The vehicular brake control apparatus according to claim 1, wherein the control unit comprises:
   a wheel speed calculation unit, a wheel acceleration/deceleration speed calculating unit, a wheel vehicle speed calculating unit, and a wheel side control portion (slip rate calculating unit) in correspondence to a brake fluid pressure adjusting unit of a front side wheel and a rear side wheel, and
   an interlocking operation control portion and a vehicle speed estimation unit common to the brake fluid pressure adjusting units of the front side wheel and the rear side wheel.

3. The vehicular brake control apparatus according to claim 2, wherein:
   the wheel speed calculation unit receives an output signal from a wheel speed sensor to calculate wheel speed,
   the wheel acceleration/deceleration speed calculating unit differentiates the wheel speed obtained by the wheel speed calculation unit to obtain acceleration/deceleration speed of the wheel speed, and
   the wheel vehicle speed calculating unit calculates a wheel vehicle speed based on the wheel speed and the wheel acceleration/deceleration speed.

4. The vehicular brake control apparatus according to claim 2, wherein:
   the vehicle speed estimation unit sets an estimated vehicle speed, which is a reference value for determining slip ratios of the front side wheel and the rear side wheel, based on a vehicle speed calculated by the wheel vehicle speed calculating units of the front wheel and the rear wheel, respectively, and
   the wheel side control portion calculates a slip ratio based on a wheel speed calculated by the wheel speed calculation unit, wheel acceleration/deceleration speed obtained by the wheel acceleration/deceleration speed calculating unit and an estimated vehicle speed obtained by the vehicle speed estimation unit, and determines a brake fluid pressure control value of an analyzed wheel brake based on the calculated slip ratio to perform opening/closing driving control of the inlet valve and the outlet valve of the control valve unit for the analyzed wheel brake.

5. The vehicular brake control apparatus according to claim 4, wherein:
the wheel side control portion sets the slip ratio to be a target value at a time of running with the estimated vehicle speed as a target slip ratio based on the estimated vehicle speed obtained by the vehicle speed estimation unit,
the control unit calculates a deviation between the target slip ratio and the slip ratio and calculates the brake fluid pressure control value of either the front wheel brake or the rear wheel brake in order to make the deviation close to "0" thereby to drive and control the inlet valve and the outlet valve of the control valve unit and the motor based on the calculated brake fluid pressure control value, and
the interlocking operation control portion controls an application of the brake force to the brake system on the side where the anti-lock brake control is not performed caused when one of the front side wheel and the rear wheel is subjected to the anti-lock brake control.

6. The vehicular brake control apparatus according to claim 1, wherein the control unit performs the brake force application control to the other of the brake systems in response to the wheel falling into the locked state.

7. The vehicular brake control apparatus according to claim 6, wherein the brake force application control is dependent on the control unit performing the anti-lock brake control.

8. The vehicular brake control apparatus according to claim 1, further comprising:
a slip ratio calculating unit which calculates a slip ratio of the wheel,
wherein the control unit performs the anti-lock brake control and the brake force application control when the slip ratio calculated by the slip ratio calculating unit reaches a predetermined value or more.

9. The vehicular brake control apparatus according to one of claim 1, wherein, when a wheel corresponding to the other of the brake systems on which the brake force application control is performed likely falls into a locked state, the control unit performs an anti-lock brake control on the other of the brake systems.

10. The vehicular brake control apparatus according to claim 1, wherein the control unit controls operations of:
an inlet valve and an outlet valve and a motor to independently adjust and control the brake forces of the brake systems to eliminate a locking tendency of the wheels thereby to perform the anti-lock brake control, and
the inlet valve and the outlet valve and the motor in accordance with outputs of fluid pressure detection sensors provided at a wheel fluid pressure path between a regulator and the respective front side wheel and rear side wheel.

11. A vehicular brake control apparatus, comprising:
at least a pair of brake operation elements independently operated;
brake systems coupled to the pair of brake operation elements, respectively; and
a control unit which controls the brake systems, wherein:
when the pair of brake operation elements is operated and one wheel corresponding to one of the brake system of the one of the brake operation elements likely falls into a locked state,
the control unit performs an anti-lock brake control on the brake system which is coupled to the wheel falling into the locked state,
the control unit also performs a brake force application control so as to apply brake force to the other of the brake systems which is different from the one brake system subjected to the anti-lock brake control, and
during a normal control where there is no possibility that wheels are locked, the brake systems are independently controlled and a respective brake fluid pressure generated by the pair of brake operation elements is transmitted as it is to respective wheel brakes.

12. The vehicular brake control apparatus according to claim 11, wherein the control unit comprises:
a wheel speed calculation unit, a wheel acceleration/deceleration speed calculating unit, a wheel vehicle speed calculating unit, and a wheel side control portion (slip rate calculating unit) in correspondence to a brake fluid pressure adjusting unit of a front side wheel and a rear side wheel, and
an interlocking operation control portion and a vehicle speed estimation unit common to the brake fluid pressure adjusting units of the front side wheel and the rear side wheel.

13. The vehicular brake control apparatus according to claim 12, wherein:
the vehicle speed estimation unit sets an estimated vehicle speed, which is a reference value for determining slip ratios of the front side wheel and the rear side wheel, based on a vehicle speed calculated by the wheel vehicle speed calculating units of the front wheel and the rear wheel, respectively, and
the wheel side control portion calculates a slip ratio based on a wheel speed calculated by the wheel speed calculation unit, wheel acceleration/deceleration speed obtained by the wheel acceleration/deceleration speed calculating unit and an estimated vehicle speed obtained by the vehicle speed estimation unit, and determines a brake fluid pressure control value of an analyzed wheel brake based on the calculated slip ratio to perform opening/closing driving control of the inlet valve and the outlet valve of the control valve unit for the analyzed wheel brake.

14. The vehicular brake control apparatus according to claim 13, wherein:
the wheel side control portion sets the slip ratio to be a target value at a time of running with the estimated vehicle speed as a target slip ratio based on the estimated vehicle speed obtained by the vehicle speed estimation unit,
the control unit calculates a deviation between the target slip ratio and the slip ratio and calculates the brake fluid pressure control value of either the front wheel brake or the rear wheel brake in order to make the deviation close to "0" thereby to drive and control the inlet valve and the outlet valve of the control valve unit and the motor based on the calculated brake fluid pressure control value, and
the interlocking operation control portion controls an application of the brake force to the brake system on the side where the anti-lock brake control is not performed caused when one of the front side wheel and the rear wheel is subjected to the anti-lock brake control.

15. The vehicular brake control apparatus according to claim 12, wherein:
the wheel speed calculation unit receives an output signal from a wheel speed sensor to calculate wheel speed, the wheel acceleration/deceleration speed calculating unit differentiates the wheel speed obtained by the wheel speed calculation unit to obtain acceleration/deceleration speed of the wheel speed, and the wheel vehicle speed calculating unit calculates a wheel vehicle speed based on the wheel speed and the wheel acceleration/deceleration speed.

16. The vehicular brake control apparatus according to claim 11, wherein the control unit performs the brake force application control to the other of the brake systems in response to the wheel falling into the locked state.

17. The vehicular brake control apparatus according to claim 16, wherein the brake force application control is dependent on the control unit performing the anti-lock brake control.

18. The vehicular brake control apparatus according to claim 11, wherein the control unit controls operations of:

an inlet valve and an outlet valve and a motor to independently adjust and control the brake forces of the brake systems to eliminate a locking tendency of the wheels thereby to perform the anti-lock brake control, and the inlet valve and the outlet valve and the motor in accordance with outputs of fluid pressure detection sensors provided at a wheel fluid pressure path between a regulator and the respective front side wheel and rear side wheel.

19. The vehicular brake control apparatus according to claim 11, further comprising:

a slip ratio calculating unit which calculates a slip ratio of the wheel, wherein the control unit performs the anti-lock brake control and the brake force application control when the slip ratio calculated by the slip ratio calculating unit reaches a predetermined value or more.

20. The vehicular brake control apparatus according to one of claim 11, wherein, when a wheel corresponding to the other of the brake systems on which the brake force application control is performed likely falls into a locked state, the control unit performs an anti-lock brake control on the other of the brake systems.

21. A control method for a brake control apparatus which comprises a pair of brake operation elements and brake systems coupled to the pair of brake operation elements, respectively, the control method being performed when one of the pair of brake operation elements is operated and one wheel corresponding to the one operated brake operation element likely falls into a locked state, the control method comprising:

performing an anti-lock brake control on the brake system of the operated brake operation element;

applying a brake force to the other of the brake systems which is different from the one brake system subjected to the anti-lock brake control; and during a normal control where there is no possibility that wheels are locked, the brake systems are independently controlled and a respective brake fluid pressure generated by the pair of brake operation elements is transmitted as it is to respective wheel brakes.

22. A control method for a brake control apparatus which comprises a pair of brake operation elements and brake systems coupled to the pair of brake operation elements, respectively, the control method being performed when both of the pair of brake operation elements is operated and one wheel corresponding to the one of the brake operation elements likely falls into a locked state, the control method comprising:

performing an anti-lock brake control on the brake system which is coupled to the wheel falling into the locked state;

applying brake force to the other of the brake systems which is different from the one brake system subjected to the anti-lock brake control; and during a normal control where there is no possibility that wheels are locked, the brake systems are independently controlled and a respective brake fluid pressure generated by the pair of brake operation elements is transmitted as it is to respective wheel brakes.

* * * * *